April 21, 1970     P. MILLER     3,507,729
CONTOURED ORNAMENTATION OF LAMINATED RESILIENT MATERIALS
Original Filed Dec. 13, 1963     4 Sheets-Sheet 1

INVENTOR.
PHILIP MILLER
BY
ATTORNEYS

INVENTOR.
PHILIP MILLER

April 21, 1970 P. MILLER 3,507,729
CONTOURED ORNAMENTATION OF LAMINATED RESILIENT MATERIALS
Original Filed Dec. 13, 1963 4 Sheets-Sheet 4

INVENTOR.
PHILIP MILLER
BY Darby & Darby
ATTORNEYS

United States Patent Office

3,507,729
Patented Apr. 21, 1970

---

3,507,729
CONTOURED ORNAMENTATION OF LAMINATED RESILIENT MATERIALS
Philip Miller, Norwalk, Conn., assignor to Hicks and Otis Prints, Incorporated, Norwalk, Conn., a corporation of Connecticut
Application Dec. 13, 1963, Ser. No. 330,357, now Patent No. 3,352,741, which is a continuation-in-part of applications Ser. No. 44,649, July 22, 1960, and Ser. No. 246,751, Dec. 24, 1962. Divided and this application May 8, 1967, Ser. No. 636,819
Int. Cl. B29c *15/00;* B32b *5/18, 7/14*
U.S. Cl. 156—209
8 Claims

---

ABSTRACT OF THE DISCLOSURE

A process of embossing, quilting and other ornamentation of a sponge sheet material is described herein which comprises depositing an adhesive upon selected areas on the surface of a liquid permeable, compressible and restorable sheet and rendering the adhesive tacky and thereafter stretching the sponge sheet and reducing the thickness of the sheet while the sheet is under compression and at least partially setting the adhesive while a fabric is overlaid on the sponge sheet after which the compression is relaxed. This process produces a quilt-like material which may have a puckered effect having selected surface areas where the thickness of the sponge sheet differs in sectional dimensions from other areas of the sheet.

---

CROSS REFERENCE TO RELATED APPLICATION

This application is a division of copending application Ser. No. 330,357 filed Dec. 13, 1963 and now U.S. Patent No. 3,352,741 application Ser. No. 330,357 is in turn a continuation-in-part of copending application Ser. No. 44,649, filed July 22, 1960 and now issued as U.S. Patent No. 3,070,476 on Dec. 25, 1962, and of copending application Ser. No. 246,751, filed Dec. 24, 1962, and now issued as U.S. Patent No. 3,257,263 on June 21, 1966.

This invention relates to a process for the embossing, quilting and other ornamentation of a laminated resilient spongy material and articles of manufacture produced by this process.

U.S. Patent No. 3,070,476 issued Dec. 25, 1962 for Ornamentation of Resilient Absorbent Materials describes techniques for embossing and quilting. The present invention represents an improvement over the inventions disclosed and claimed in the above mentioned patent.

In the contoured laminated article of the U.S. Patent 3,070,476 it was preferred that the contour be present on only one side of the material. Furthermore, knitted or other stretchable materials were preferred for the overlay to allow for expansion of the foam.

The present invention relates to contoured ornamentation of fabric overlaid sponge materials and more particularly to the production of surface ornamentation on both sides of a sandwich consisting of a sponge sheet between two laminar sheets to form a quilt like material.

The present invention is also adapted to use of substantially unstretchable overlay materials and excess overlay is provided to accommodate expansion of the contoured pattern by prestretching the foam and allowing the foam and overlay to shrink after contouring.

The invention also provides a process of producing the quilt like materials with a puckered effect. In accordance with the invention it has been found that not only may a contoured ornamentation of the fabric overlaid sponge sheet materials be achieved but additional ornamentation of the fabric sheet may be obtained through a puckering effect, in some cases including raising the laminar material above the surface of the sponge sheet material. The distinctively puckered effect is also achieved by stretching the foam sheet in either a longitudinal or a latitudinal direction, or both, before the foam sheet undergoes lamination.

A further improvement relating to contoured ornamentation of fabric overlay sponge sheet material is achieved by having hot rolls followed by rolls which are kept at a temperature below room temperature so as to bring about a rapid setting of the adhesive material after it has been preconditioned by hot rolls. The advantage of having the hot and cold rolls is to cause a permanent deformation at a maximum depth and thus give distinct and deep contouring of the sponge sheet material. This assures that the contour lines will be clear, distinct, of desired depth, and substantially reproduced in an overlayed fabric.

In accordance with the invention, a wide variety of surface colorings, contours, contrasts, and combinations of the same may be produced. Perfect registry between ornamentation on the two surfaces may readily be achieved.

The present invention is particularly useful with filler sheet materials which are liquid-absorbent and which are resilient. The degree of resilience may vary considerably, commensurate with the objectives of the invention. Hence, a wide range of hysteresis curves for the resilient material is normally acceptable.

Among the filler materials which are most suitable for the practice of this invention are open-cell foam sheet materials such as polyether and polyester polyurethanes, natural rubber, synthetic rubber, and vinyl plastics. The cells are preferably interconnected initially before the ornamentation process is practiced, but it is also contemplated that closed pore or closed cell materials may be used and the walls between the cells may be broken down mechanically as by crushing or by heating to expand the gas within the cells or by applying a solvent which penetrates or breaks down portions of the walls between the cells. Representatives of the filler materials are foam or sponge rubber materials including foamed latex, and foamed or expanded synthetic rubber polymers and copolymers such as butadiene-styrene, butadiene-acrylonitrile, polyvinylidene, isoprene polymers and copolymers, as well as polyvinyl chlorides and polyvinyl acetates and copolymers thereof and related compositions. "Sponge sheet" as used hereinafter will mean any of the materials described as those to which this process may be applied or their equivalents.

The overlay fabric or web may in some cases be stretchable. "Stretchable" in this description and in the claims shall include being extendible in one direction and not in others, as in a woven fabric stretchable on the bias; and shall also include being stretchable under artificial conditions only, such as at elevated temperatures, and not under normal conditions, such as room temperature. Good results are obtained also with unstretchable overlays, particularly by the expedient of prestretching the sponge sheet before laminating.

The sponge sheet may be simultaneously contoured and overlaid on both sides of a series of steps, starting with depositing an adhesive upon selected areas on the surfaces of the sheet. The adhesive is rendered tacky and at least partially settable in any desired manner, as it well known in the adhesive art, e.g., by the passage of time, evaporation of solvent, in situ polymerization or copolymerization or condensation of the components, application of heat or pressure, or a combination of the foregoing. After the adhesive is rendered partially settable, the sponge sheet is stretched in a longitudinal or latitudinal direction. The thickness of the sheet is then uniformly reduced and the adhesive is at least partially set while the sheet is under compression. At the same time a fabric may be overlaid on both sides of the sheet. The sheet is then relaxed. The relaxation of the sponge sheet permits recovery of the unselected areas, contrasted with at least partially continued deformation of the selected areas. Thus, there is formed, in accordance with the invention, a quilt-like material having selected surface areas where the thickness of the sheet, corresponding to the selected areas, differs in sectional dimension from other areas of the sheet. In the case of insufficiency of the foam volume to fill the quilt "pockets," the fabric overlay will remain in excess, thus giving a loose puckered effect.

In the preferred embodiment each cross-section of the sheet which has a depressed surface area comprises an adhesive which holds the pores of the sponge at least under partial compression. The term "adhesive" as used herein also may include any composition, whether normally considered an adhesive or not, which has the ability to maintain deformation of the walls of the cell structure, and preferably at elevated temperatures encountered in washing, machine drying or the like.

Various present preferred embodiments of the invention are illustrated in the accompanying drawings, in which.

Figure 1:
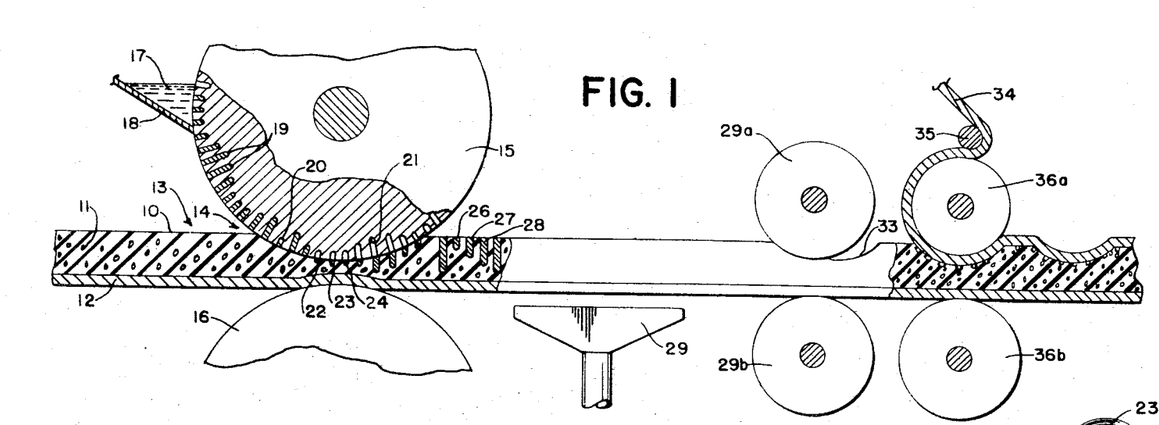
FIGURE 1 is a diagrammatic illustration of apparatus for producing embossed sponge materials.

The basic principles of the process utilized in the present invention may be understood by reference to FIGURE 1. A sheet of spongy resilient material 10, e.g., polyurethane foam, having pores 11 interconnected with each other is backed by a base sheet 12 which may conveniently be a textile fabric or any other material suitable to support the spongy material 10. The sheet 12 is preferably air-pervious to facilitate rapid drying of the spongy material 10; although sheet 12 may, when desirable, be fluid-impervious.

The composite sheet 13 comprising base 12 and sponge 10 is passed through a nip 14 between rolls 15 and 16. Roll 15 is a gravure or engraved roll which is inked in any suitable manner as by an adhesive 17 applied by a doctor blade 18. In the present example the adhesive is of a color contrasting with the sheet 10 although it will not always be so.

In the embodiment shown in FIGURE 1, the roll 16 is a smooth-surfaced cylinder which may be made of metal, or rubber or metal coated with rubber or otherwise suitably constructed. As will be seen in further embodiments the back-up roll 16 may, when desired for surface ornamentation, be an engraved roll similar to roll 15, with either a similar or contrasting design engraved or otherwise produced thereupon. Roll 16 may be caused to be rotated at a speed synchronized with that of roll 15.

The surface of the roll 15 contains engraved or otherwise produced recesses 19. Each of the recesses is inked in any suitable manner by the colored adhesive 17 which is temporarily retained in the recess by adhesive or capillary action or otherwise. As the sheet 13 is fed through the nip between the rolls, those recesses 19 and 20 which are inked are gradually brought into compressive contact with the spongy material which beginning in the vicinity of the compressed surface at 22, commence to deposit the adhesive into the body of the spongy material 10 as at 23 and 24. The depth of the adhesive thus imprinted corresponds to the depth of the recesses from which the adhesive is deposited. The depth to which the deposited adhesive penetrates and impregnates (these terms being used interchangeably throughout the description and claims) the compressed spongy sheet 10 varies as between imprints 22, 23 and 24, but each penetrates and impregnates transversely into the thickness of the spongy sheet dependent upon the volume of adhesive applied at the proper viscosity.

It will be noted that at the inked impressions 26, 27 and 28, the imprints are all relatively straight lines traversing the thickness of the spongy material. One of the advantages of the process, especially when printing spongy material is that the process tends to lessen lateral migration of the adhesive thereby producing relatively sharp-edged, well defined patterns. Apparently the relaxation of the spongy sheet 10, after it leaves the printing nip has the effect of confining the adhesive to transverse paths and minimizes further flow of the adhesive in a direction other than transverse.

After the adhesive is deposited, it is rendered at least partially settable by any suitable means. For example, if the adhesive is in a volatile carrier or solvent, passing the sponge web over a heater 29 to remove at least part of the solvent, renders the adhesive settable and hence the product is ready for the next step. Some adhesives then become tacky.

The sheet is then fed to a pressure device, for example, a pair of squeeze rolls 29A and 29B having a nip therebetween of predetermined dimension less than the normal thickness of the sponge web. This second compression of the sheet, after the adhesive ink has been rendered settable, reduces the thickness of the sheet at the nip. In the areas of the sponge web to which the adhesive has been applied, the selected portions of the sheet remain compressed and the unselected areas of the sheet expand by virtue of the resilience of the sheet, back to their original thickness. Thus, there is produced on the sheet a selected contour corresponding precisely to the adhesive applied to the selected areas. To prevent the inked areas of the sheet from adhering to the squeeze roll 29a in contact therewith, it has surprisingly been found sufficient to cool that roll, preferably below 70° F., for the usual adhesives.

After passing between rolls 29a and 29b, only those portions of the sheet free from adhesive will fully return to their original thickness whereas the cells of the material in the adhesive coated areas will be maintained in deformed condition causing a reduction of thickness of the sheet in these areas as indicated at 33.

According to the invention, a fabric 34 is overlaid on sheet 13 in such a way as to conform to the contour of the upper surface of the sheet.

In many instances, it will be desired that the sheet 34 be stretchable in at least one direction to better conform to the contour of sheet 13 and in such case a knitted fabric may be used to advantage. In other cases, excess overlay may be provided by prestretching the spongy material as will later be explained in more detail.

It is a desirable feature of the present invention that in many cases the adhesive 17 which is utilized to contour the spongy material may also be utilized as the sole means for securing the fabric 34 to the composite sheet 13. For example, in FIGURE 1, the fabric 34 is guided (from a supply roll, not shown) over a guide roll 35 to an overlay roll 36 which rolls the fabric 34 on to the sheet 13 and applies sufficient pressure to cause adherence between fabric 34 and sheet 13. Roll 36 may, if desired, be a heated steel roll to facilitate adherence between fabric 34 and sheet 13.

Of course, additional adhesive may be utilized to secure the fabric 34 to the sheet 13 as by spraying or otherwise applying such adhesive over the surface of sheet 13 between its passage under roll 29A and under roll 36A.

A support roll 36B cooperates with roll 36A to provide the proper pressure to secure fabric 34 to sheet 13. The completed material merging from between rolls 36A and 36B accordingly is contoured in accordance with the pattern of printing roll 15 and it has secured thereto in conformation with such contour, a fabric overlay 34.

In some cases, the fabric 34 may be partially transparent and the adhesive 17 colored. Thus the pattern of the adhesive 17 on the spongy sheet 10 will be partially visible through fabric 34 to provide a further decorative effect. As will later be explained, the fabric may also be printed with a pattern conforming to the adhesive by controlling the adhesive viscosity to cause it to soak through to the outer surface of the fabric. Obviously, the spongy sheet 10 or the fabric 34, or both, may be imprinted before or after processing as illustrated in FIGURE 1 with any desired design by conventional process to provide additional decorative effect.

It is contemplated in the arrangement of FIGURE 1, that the backing 12 be previously applied to spongy sheet 10 by any of numerous techniques known in the art and that the thickness of the spongy sheet 10, and the character of the backing 12, relative to the fabric overlay 34 be such that the contour effect will be predominant on the upper surface of the finished sheet as illustrated in FIGURE 1.

Figure 2:
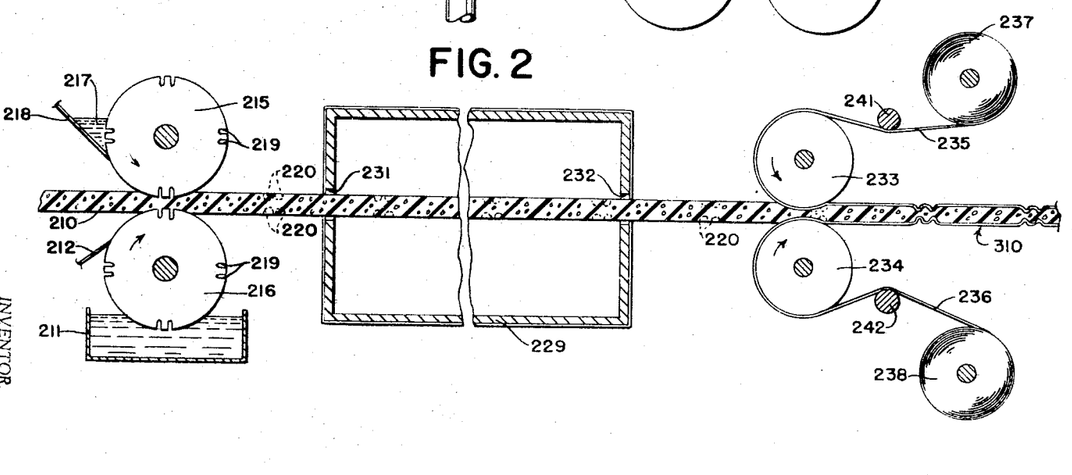
FIGURE 2 is a diagrammatic illustration of an alternative form of an apparatus for producing materials according to the invention.

Contour effects may be provided on both sides of sheet material according to the present invention, for example, by apparatus according to the invention as illustrated in FIGURE 2. By the somewhat more complicated technique of sandwiching single surface contoured sheets back to back, a front and back contoured surface may also be obtained.

In FIGURE 2 a sheet of spongy resilient material 210, e.g., open pored polyurethane foam, is passed through a nip 214 between rolls 215 and 216.

Rolls 215 and 216 are gravure or engraved rolls which are inked in any suitable manner with an adhesive 217. For example, the ink 217 may be appropriately applied by doctor blade 218 to roll 215 and may be applied to roll 216 by partial immersion in a reservoir 211 with the excess being removed by a further doctor blade 212.

The surfaces of rolls 215 and 216 contain engraved or otherwise produced recesses 219. It will be understood that the adhesive 217 is temporarily retained in the recesses 219 by adhesive action, capillary action, or the like.

As the sheet 210 is fed through the nip 214, between the rolls, the recesses 19 are gradually brought into compressive contact with the sheet 210, the recesses of roll 215 in contact with the upper surface of the sheet and the recesses of the roll 216 in contact with the lower surface of the sheet.

The recesses commence to deposit the adhesive into the body of the spongy material 10 substantially as explained with respect to FIGURE 1.

The patterns on rolls 215 and 216 may be identical and the rolls may be rotated in synchronism to produce contours on the respective surfaces of sheet 210 which are corresponding and in register, i.e., coincident. Alternatively different patterns may be utilized on the respective rolls or the patterns may be intentionally out of register and/or of different periodicity.

After the adhesive is deposited, it is rendered at least partially settable by any suitable means. In FIGURE 2, the specific means is an elongated oven 229 having openings 231 and 232 for the ingress and egress of the sheet 210.

The sheet 210 is then fed to a pressure device, for example, a pair of squeeze rolls 233 and 234 having a nip therebetween of predetermined dimension less than the normal thickness of the sponge web.

Rolls 233 and 234 also serve to guide fabric sheets 235 and 236 into place on the upper and lower surfaces respectively of sheet 210. Long continuous sheets of fabric 235 and 236 may be supplied from supply rolls 237 and 238. Appropriate tension controlling mechanism such as idler rolls 241 and 242 may be provided.

The second compression of the sheet 210 along with fabric sheets 235 and 236 reduces the thickness of sheet 210 at the nip of rolls 233 and 234 and causes fabric sheets 235 and 236 to adhere to spongy sheet 210 in those areas 220 where it is coated with adhesive 217. Rolls 233 and 234 are preferably heated rolls which may be formed of steel, aluminum or the like. The heating of rolls 233 and 234 facilitates adherence of fabric sheets 235 and 236 to the spongy sheet 210. The heating may be accomplished by steam, electrically, or one of many other techniques well known in the art, and the roll temperature may be 250° F., for example, or generally from 150-350° F. In many instances it will be preferred that the fabric overlay be heated to a greater extent than the spongy filler sheet when passing between rolls 233 and 234. (Heating the overlay more efficiently accomplishes the purpose of aiding adhesion of the overlay to the spongy sheet.) Greater heating of the overlay is provided by allowing it to pass around a substantial portion of the periphery of rolls 233 and 234. The same adhesive material deposited in areas 220 causes walls of the cells of spongy sheet 210 to adhere together and be permanently deformed. Accordingly, such areas do not return to their original thickness after passing between rolls 233 and 234, and, as a result, both surfaces of the composite sheet 210, 235, 236 are contoured in a pattern corresponing to that laid down by printing rolls 215 and 216.

It may be noted that the sponge sheet tends to be elongated (longitudinally) while passing through the various nips. If the fabric sheets 235, 236 are applied in such a nip, there will be excess fabric relative to the sheet 210. The excess fabric will normally be taken up in following the contours of the quilting.

Figure 3:
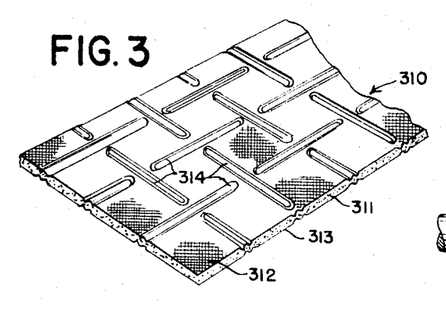
FIGURE 3 is an isometric view of material produced according to the present invention and particularly as may be produced from the apparatus of FIGURE 2.

Attractively decorated sheet material may thus be produced by the apparatus of FIGURE 2, for example, the simulated quilted material of FIGURE 3.

As will be seen from FIGURE 3, the simulated quilted material 310 comprises an open-pored resilient sheet material 311 such as polyurethane foam sandwiched between respective layers 312 and 313 of web material which may be, for example, woven textile fabric, non-textile sheet, or knitted textile fabric. The latter is particularly desirable by virtue of the fact that it is resiliently stretchable and thus easily conformed to the pattern of depressions 314 which provide the quilting effect in the composite sheet material 310.

As an example of nontextile sheet, a plastic sheet material such as polyethylene, polypropylene or polymers or copolymers of vinyl chloride may be utilized. In such case it may be desirable to maintain the final rolls at a temperature which will soften but not melt the plastic sheet.

Where woven fabric is used as overlay it may be desirable to arrange the woven fabric on the bias with respect to elongated depressions in the pattern as shown in FIGURE 3.

Preferably, the adhesive 17, utilized to form the sheet material 310, is one which is not adversely affected by high temperatures (e.g. 250° F.) so that the simulated quilted fabric 310 may be machine washed and machine dried without detrimental effect.

The material of FIGURE 3 has numerous advantages for use such as a bed cover, clothing lining etc., in that it is inexpensive, and of light weight with good insulation properties.

Quilted material produced on a multiple-needle sewing machine is relatively expensive due to the slow speed of an operation of such a machine as compared with a machine according to applicant's invention. Furthermore, there are practically no limitations on the pattern of quilting producible by applicant's machine whereas many limitations exist with respect to quilting produced on a multiple-needle sewing machine.

Figure 4:
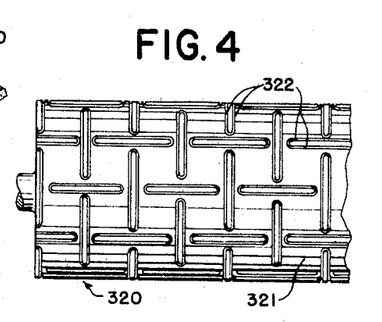
FIGURE 4 is an elevational view of a printing roll suitable for producing the contour pattern of FIGURE 3.

FIGURE 4, shows a form of printing roll suitable to produce the material of FIGURE 3. The roll 320 has a generally cylindrical surface 321 with depressions 322 forming a pattern having a generally square grid-like configuration corresponding to the pattern desired for the finished material illustrated in FIGURE 3.

While the apparatus and process illustrated in FIGURE 2 contemplates depositing adhesive directly on the spongy sheet, it may in some cases be preferred to print the fabric overlay with the adhesive which will then be coated on to the spongy material upon the joinder of the fabric and the spongy material giving generally the same result as that of FIGURE 2.

Figure 5:
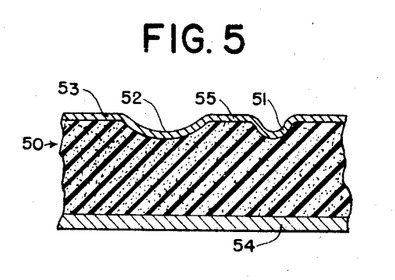
FIGURE 5 is a fragmentary cross section of an embossed material.

FIGURE 5 shows an embossed spongy sheet producible by the apparatus of FIGURE 1 in which the sponge layer 50 has depressions 51 and 52 formed in suitable manner such as described above. A superposed sheet of surface coating material 53 may comprise a knitted, woven or other fabric, sheet plastic such as polyethylene, vinyl sheeting, or other similar laminar material. The material may be stretchable to facilitate deeply contouring the composite sheet. The base 54 may be attached or applied before or after the contouring operation or may be omitted. This sheet 50 is made by first applying adhesive in the manner described above. In the product shown in FIGURE 5 the adhesive does not benefit by a color component unless the layer 53 is translucent. The layers 50, 53 and 54 may be adhered together in the above described manner so that contoured material body is produced having an upper added layer conforming to the contour, which conformation is achieved solely by the adhesive which creates the contoured effect in material 50.

Figures 6, 8:
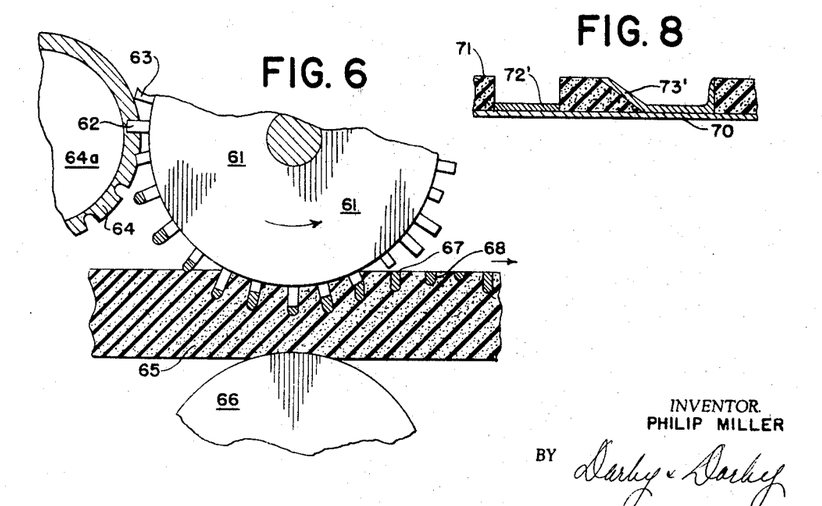
FIGURE 6 is a diagrammatic elevational view of an alternative form of printing roll.
FIGURE 8 is a similar view of the material of FIGURE 7, after the material has been compressed and partially set.

As shown in FIGURE 6, the printing roll 61 may have long projections 62 and short projections 63 to pick up adhesive 64 from a rubber inking roll 64a. As the sponge sheet 65 passes between the nip between rolls 61 and 66, the adhesive is deposited at 67, 68, etc.

Longer projections 62 would pick up less adhesive while shorter projections 63 would pick up a greater amount, thereby achieving substantially the result achieved by the apparatus of FIGURE 1. Various other types of printing rolls may be used to deposit the adhesive.

Figure 7:
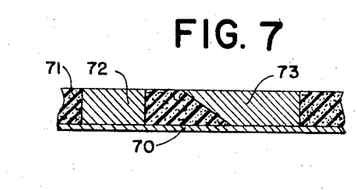
FIGURE 7 is a diagrammatic cross section of a sponge sheet having adhesive deposited thereon to form a variable depth contoured pattern in accordance with the invention.

FIGURE 7 shows a cross-section of a web 70 supporting a spongy material 71 having one area 72 produced all the way through the spongy material and another wedge-shaped section 73 of adhesive applied at another selected area and cross-section. This fabric after deposit, as shown in FIGURE 7, is heated, the adhesive rendered tacky, and then is passed through a cold nip. After relaxation, the material shown in FIGURE 8 is produced. Here the spongy layer 71 attached to the web 70 has a compressed area 72' corresponding to printed area 72 and another slanted area 73' contoured corresponding generally to printed area 73. Thus contours of desired slope as well as depth may be formed and substantially reproduced in an overlaying fabric (not shown). FIGURES 7 and 8 therefore illustrate the manner in which the depth and slope of contour in materials according to the invention may be controlled by controlling the density of adhesive deposited as by roll 15.

Figure 9:
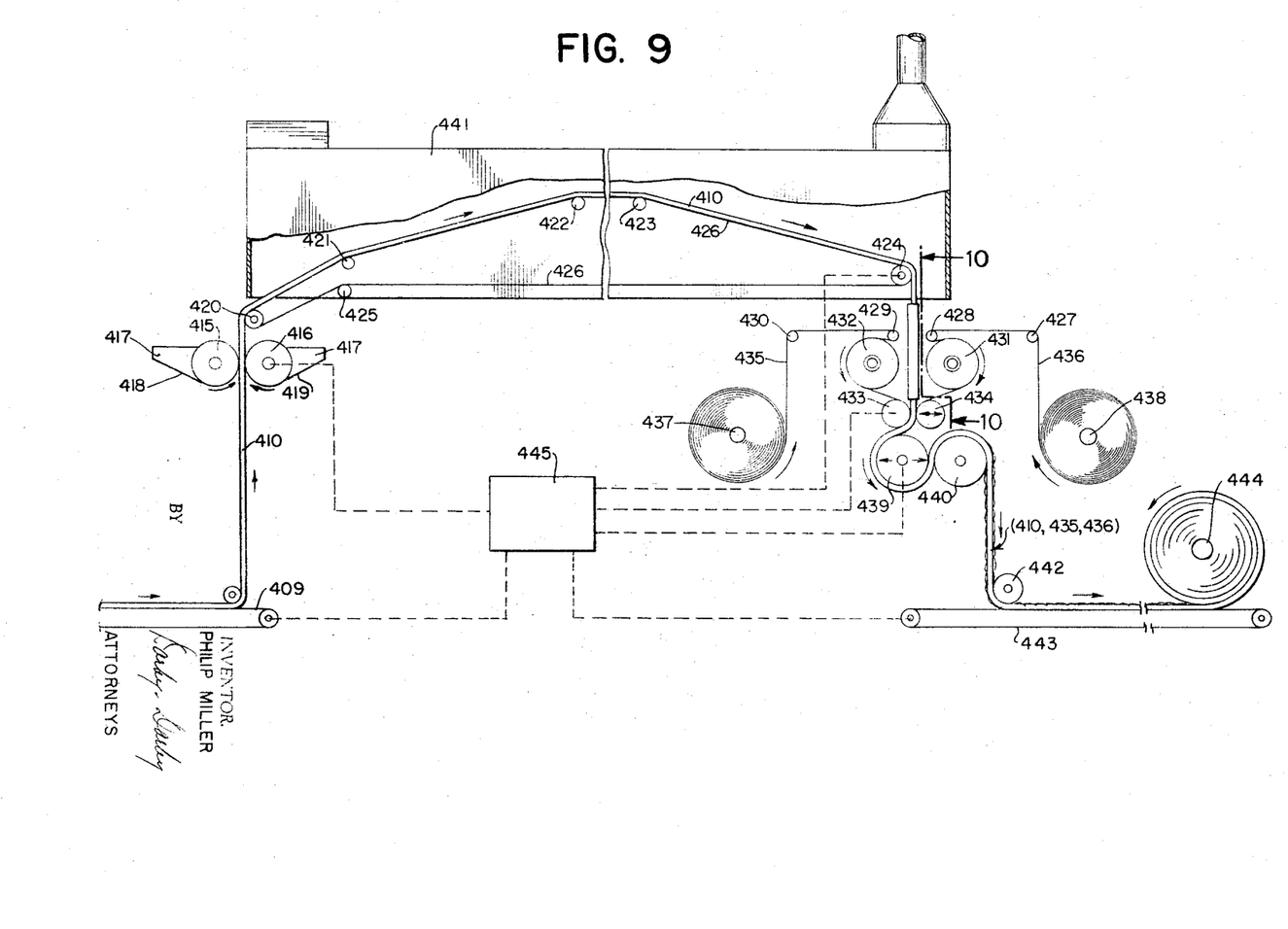
FIGURE 9 is a partially diagrammatic elevational view of a further alternative form of an apparatus for producing materials according to the invention.

FIGURE 9 shows a preferred form of apparatus that may be employed according to the present invention. In FIGURE 9 a conveyor belt 409 carries sponge sheet material 410 (from a supply roll, not shown), between printing rolls 415 and 416.

Sponge sheet material 410 is fed between engraved rolls 415 and 416. These rolls are inked by an adhesive 417 in any suitable manner, as by doctor blades 418 and 419. As the sponge sheet material 410 is fed through rolls 415 and 416, the rolls deposit the adhesive 417 into the body of the spongy material 410. The depth of the adhesive imprinted corresponds to the depth of the recesses in the rolls from which the adhesive is deposited. After the adhesive is deposited, the sponge sheet material 410 is fed through an oven 441 on a release type of conveyor belt 426 by means of guide rolls 420, 421, 422, 423, 424 and idler 425. The release coating for the conveyor belt is material such as Teflon, silicon compounds or other compositions which are well recognized in the art as release coating agents. The release coating on the conveyor belt 426 prevents the adhesive on the under surface of sponge sheet material 410 from sticking to the conveyor belt 426 as the sponge sheet material 410 is fed through the oven 441.

As sponge sheet material 410 is fed through the oven 441 the adhesive 417 impressed on sponge sheet material 410 is rendered partially settable by evaporation of the solvent present in the adhesive, thereby rendering the adhesive tacky. As the sponge sheet material 410 passes over guide roll 424 the material is subjected to controlled latitudinal and longitudinal stretching.

Figures 10, 11, 12, 13:
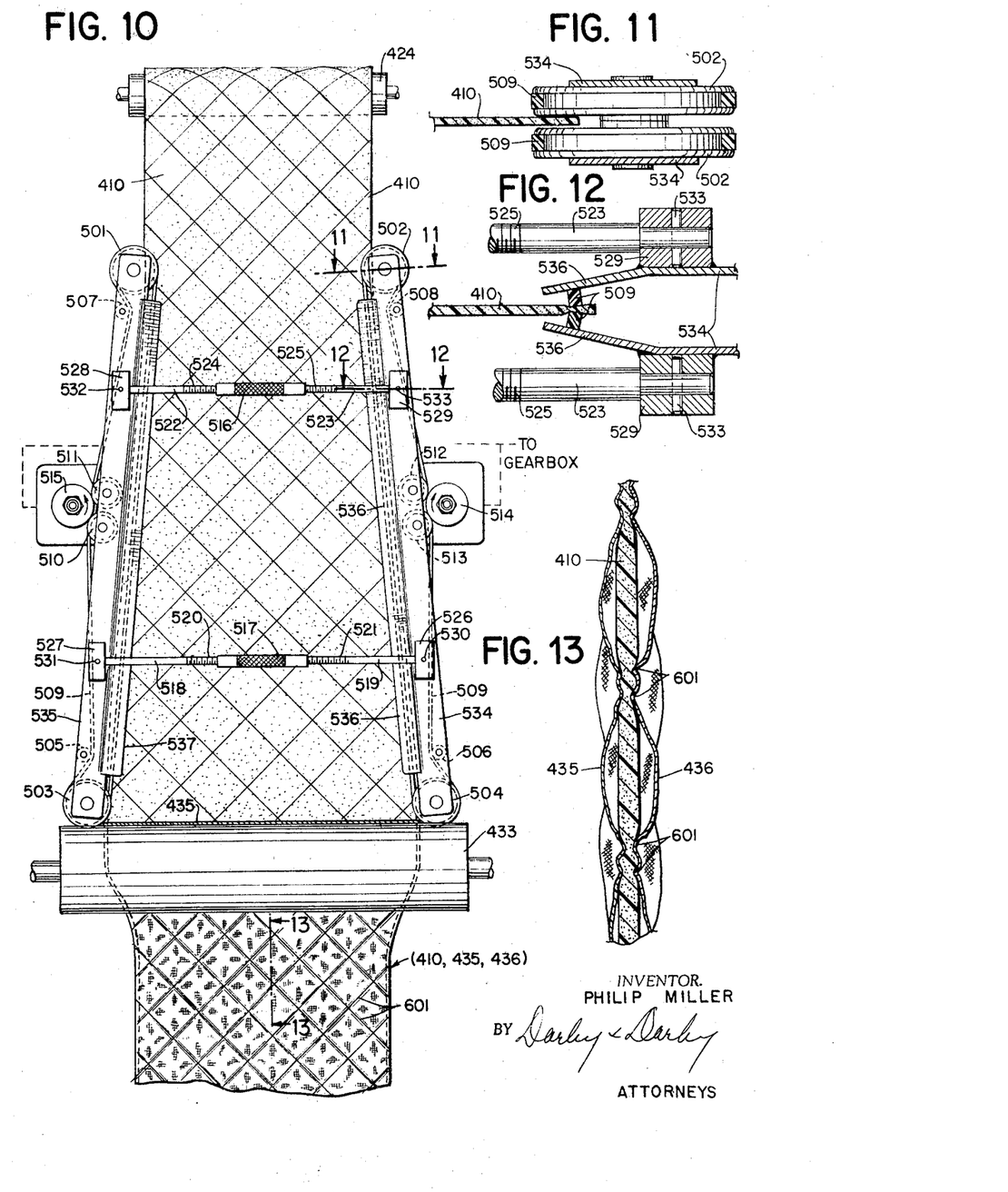
FIGURE 10 is a sectional view of the apparatus of FIGURE 9 taken the line 10—10 in FIGURE 9.
FIGURE 11 is a sectional view of the apparatus of FIGURE 10 taken along the line 11—11 in FIGURE 10.
FIGURE 12 is a sectional view of the apparatus of FIGURE 10 taken along the line 12—12 in FIGURE 10.
FIGURE 13 is a sectional view of material produced according to the present invention taken along line 13—13 in FIGURE 10.

The function of the stretching mechanism shown in FIGURE 10 is to stretch the sponge sheet material 410 in a latitudinal direction before laminar material 435 and 436 is overlaid on the sponge sheet material 410. As shown in FIGURE 10, the sponge sheet material 410 passes over guide roll 424 and between pulleys 501, 502, 503 and 504 as best seen in FIGURE 11.

Four belts 509 guided by pulleys 501, 502, 503 and 504 are driven by means of driver wheels 514 and 515. The driver wheels 514 and 515 are connected to a gear box 445 and are driven at a predetermined speed ratio with the other elements driven through the gear box 445. Pulleys 501 and 503 and pulleys 502 and 504 are supported by frame members 534 and 535, respectively. The interior side of members 534 and 535 are formed into belt camming surfaces as shown at 536 and 537. The camming surfaces 536 and 537 press the pulley belts 509 against the opposite surfaces of sponge sheet material 410 to grip the material 410. See FIGURE 12. Due to the divergence of belts 509 the material is latitudinally stretched in passing through the apparatus of FIGURE 10.

The stretcher device shown in FIGURE 10 is constructed so that the distance of the pulleys 501, 502, 503 and 504 and hence of belts 509 from each other may be adjusted as to width of spacing or divergence of the belts by means of turnbuckles 516 and 517 which connect cross bars 518, 519, 522 and 523, respectively. The cross bars 518, 519, 520 and 521 are pivotally secured at 520, 521, 524 and 525 to permit the enlarging and narrowing of portions of the stretching device as desired. The stretcher apparatus shown in FIGURE 10 is also provided with idler pulleys 505, 506, 507 and 508.

The various elements driven from gear box 445 may be driven at difficult speeds and in FIGURE 9 it is contemplated that belts 509 will be driven faster than conveyor 426 thus imparting a longitudinal stretch to the sponge sheet material. Thus, as the sponge sheet material 410 is fed through the stretcher device of FIGURE 10, the material is stretched in both a longitudinal and latitudinal direction as shown by the increasing size of the squares of the sponge sheet material 410 as it passes through the stretcher device 10.

Upon leaving the stretching device of FIGURES 10–12 the foam sheet material 410 is overlaid on both sides by a laminar material 435 and 436 which is supplied to the sponge sheet material 410 from supply rolls 437 and 438, over guide rolls 427, 428, 429, and 430 to preheating rolls 431 and 432.

The compression of sponge sheet material 410 along with laminar materials 435 and 436 by the compression rolls 433 and 434 produces a reduced thickness of sponge sheet 410 at the nip of rolls 433 and 434 and causes the laminar materials 435 and 436 to adhere to the sponge sheet material 410 in those areas where the sheet material is coated with the adhesive 417. The rolls 433 and 434 are preferably heated rolls which may be formed of steel, aluminum, or the like. The heating of rolls 433 and 434 facilitates adherence of the laminar materials 435 and 436 to the spongy sheet material 410.

The adhesive material 417 deposited in specified areas of the spongy sheet material 410 causes walls of the sponge sheet material 410 to adhere together and to be permanently deformed as more fully explained with reference to FIGURE 2. When the sponge sheet material 410 and laminar materials 435 and 436 are fed through rolls 433 and 434 the contoured areas do not return to their original thickness after passing between rolls 433 and 434. As a result, both surfaces of the composite sheet 410, 435, and 436, are contoured in a pattern corresponding to that laid down by the printing rolls 415 and 416. In addition, the composite material may be puckered in areas where there is insufficiency of foam volume to fill the laminar material 435 and 436 above the foam sheet 410 as shown in FIGURE 13 showing a composite material 410, 435 and 436 according to the process described with reference to FIGURES 9–12.

After the composite material 410, 435 and 436 is fed through rolls 433 and 434 it is fed between rolls 439 and 440. Rolls 439 and 440 are preferably kept at a temperature below room temperature. The rolls 439 and 440 may be formed of steel, aluminum or the like. The cooling of rolls 439 and 440 may be accomplished by conventional techniques well known in the art. The feeding of a composite material 410, 435 and 436 between rolls 439 and 440 results in a rapid setting at a maximum depth of the adhesive material and will produce a more distinctly contoured composite material.

The finished composite material may be fed on to a conveyor belt 443 with the aid of roll 450 and the material then reeled on a take-up roll 444.

FIGURE 13 shows a cross-sectional view of the composite material 410, 435, and 436 produced according to the present process by apparatus as represented by FIGURES 9–12. FIGURE 13 shows the distinct contouring 601 where the cells of the spongy sheet material have been compressed and have not returned to their original volume. In addition, FIGURE 13 shows that the overlaid laminar materials 435 and 436 have adhered to the sponge sheet material 410 in these compressed areas 601 to give a distinct contoured effect. FIGURE 13 also shows how the laminar materials 435 and 436 may be puckered above the surface of the sponge sheet material 410 to give additional ornamental effects to the contoured composite material. Of course the loose puckering effect in FIGURE 13 is optional and the excess of overlay fabric may be controlled to be just sufficient to accommodate the thick sponge material between compressed areas 601 to provide a tightly quilted effect.

There are many variations and modifications of the process as shown in FIGURES 9–12 which may be achieved without departing from or varying the scope of the present invention.

The latitudinal stretcher device shown in FIGURES 10–12 may be omitted from the apparatus shown in FIGURE 9 without departing from the scope of the invention. When the spongy sheet material employed in the process, according to the invention, is passed through the oven and then to the hot rolls without the stretching of the sponge sheet material in a latitudinal direction a puckered effect above the surface of the sponge sheet material may still be achieved due to the fact that the sponge sheet material is stretched in the direction that the material is being fed into the hot rolls 433 and 434.

A further modification of a process illustrated in FIGURE 9 may be achieved by keeping oven temperature sufficiently low so that when the sponge sheet material passes through the oven the adhesive is still in a flowable state. Accordingly, if a colored adhesive is used, and the laminar material is overlaid on this colored adhesive material deposited on the sponge sheet material (which is still in a flowable state) the adhesive material will penetrate through the under surface of the laminar material producing a decorative effect on the upper surface of the laminar material. As a result it is possible to provide a vivid decorative color effect when the adhesive material penetrates through the under surface of the laminar material. It is thereby possible to produce a contoured quilt-like material which has a decorative color scheme conforming in whole or in part to the contours.

In carrying out the embodiment of the invention just described wherein the adhesive material is still flowable after the foam sheet material passes through the oven it is preferred that the rolls 433 and 434 be coated with a release type composition such as Teflon, silicon compounds, or the like, to avoid adherence of the adhesive to the rolls.

Another modification which is contemplated within the scope of the invention is stretching the laminar material with respect to the sponge sheet material rather than stretching the sponge sheet material with respect to the laminar material thereby to obtain a still wider variety of ornamentation.

The product of the present invention is useful not only as decorative material but may be utilized as heat and sound insulators, for example, on airplane cabin surfaces, automobile passenger compartments on walls of rooms, as box linings, as bed coverings, for clothing and in other applications where decoration or insulation or both are desired. In auto body headliners, the flexibility and resilience of the invention greatly facilitate installation by unskilled labor. Fire-retardent or other coatings may be applied to the outer surface of the decorating materials, either before or after printing, embossing and processing, so long as such application does not harm the final characteristics sought in the ultimate product.

Various printing compositions may be used in which dyes, inks, pigments, lacquers, and other suitable coloring compositions may impart the desired tint or hue. The adhesive may be rubber cement, rubber latex, synthetic rubber cement, cellulose cement, heat-sensitive adhesives, pressure-sensitive adhesives, and thermosetting compounds. Particularly advantageous results have been obtained using epoxy resins, with various catalysts well known in the adhesive art.

Any material may be used having adhesive properties and which can be injected by the printing process into the body of the spongy material. The adhesive may be applied by a continuous process such as described above, or in special cases may be done on a flat plate process, such as silk screenings, followed by a flat plate or press squeezing process to impart the necessary ultimate contour of the material.

If desired, the process may be practiced by first printing the total or partial surface with the adhesive, then over-printing with a solvent (inked or clear) to relax the compressed portion.

While the invention may obviously be practiced with a wide variety of materials as indicated herein, the following examples are preferred embodiments which have been used with success. In each instance the parts are by weight unless otherwise stated.

EXAMPLE 1

The adhesive formulation may be in the following range:

Acrylonitrile rubber (butadiene acrylonitrile copolymer) —10–40%.
Vinyl chloride-vinyl acetate resin—45–15% (generally used in decreasing amounts with increasing amounts of acrylonitrile rubber).
Toluol—20–60%.
Methylethyl ketone—10–40%.

Almost any dye or pigment may be used to impart a desired color to the adhesive. Viscosities may range 100 cps., to 5000 cps., depending upon the depth of engraving, speeds of operation, and drying times desired. The amounts of rubber and vinyl resin may vary and either may be omitted if desired.

The solvents may also be varied, depending upon the consistency and requirements of the adhesive.

EXAMPLE 2

|  | Parts |
|---|---|
| Polester solution (Du Pont #46951) 20% solids | 25 |
| Isocyanate solution (Du Pont #RC–805) 60% solids | 7 |

The above resins are mixed and color added, if desired, either dyes or pigments. The viscosity can be adjusted by adding either dioxane, methyl ethyl ketone, or tetrahydrofuran so that a good printing viscosity is achieved, namely, 150 to 300 cps.

EXAMPLE 3

|  | Parts |
|---|---|
| Epoxy resin (Shell Chemical Co. #1003, parts solids in a 70% solution | 60 |
| Polyamide cure (General Mills Corp. #125), parts solids in a 70% solution | 40 |
| Pigment, e.g., TiO$_2$ solids | 100 |
| Total solids | 200 |

EXAMPLE 4

|  | Percent |
|---|---|
| Acrylic ester resin (Rohm & Haas B72) | 30 |
| Toluol (solvent) | 70 |

Mixtures of vinyl resins and acrylic resins may be used with appropriate solvents in the adhesive formulations.

EXAMPLE 5

Linear thermoplastic polyester resin (Goodyear Rubber Co. Vitel PE–207) is dissolved in a suitable solvent such as toluol in sufficient quantity to provide about 20% solids in solution. An optional added ingredient to give high temperature and solvent resistance is an isocyanate (for example, Du Pont #RC–807). About 10% added isocyanate provides desirable temperature and solvent resistance. The amount of such resistance varies generally with the amount of isocyanate, however, and thus the quantity of isocyanate may be varied to obtain a wide range of characteristics.

EXAMPLE 6

A further adhesive formulation may be provided by substituting for Vitel PE–207, Du Pont adhesive #46960 and as an isocyanate Du Pont #RC–805 in Example 5.

While certain present preferred embodiments of the invention have been shown and described it is to be understood that the invention may be otherwise embodied and practiced within the scope of the appended claims.

What is claimed is:

1. The process of laminating and contouring a liquid permeable, compressible and restorable sheet which comprises coating an adhesive onto selected areas of the surface of said sheet, placing a layer of laminar material on said surface, at a time when said adhesive is settable reducing the thickness of at least portions of the sheet, by compressing said layer together with said sheet causing said layer to adhere to said adhesive coated areas of said sheet, said portions including both said selected areas and other areas, at least partially setting said adhesive while said sheet is in compression and relaxing the compression on said sheet to conform said layer of laminar material at least in part to resulting contours of said surface.

2. The process of claim 1 wherein said laminar material is stretchable at least during said step of relaxing the compression.

3. The process of claim 1 further including the step of rendering said layer of laminar material temporarily stretchable prior to pressing said layer against said sheet.

4. The process of claim 1 further including the step of stretching said sheet prior to adhering said layer thereto.

5. The process of laminating and contouring a liquid permeable, compressible and restorable sheet which comprises coating an adhesive onto selected areas of both surfaces of said sheet, at a time when said adhesive is settable reducing the thickness of at least portions of the sheet, said portions including both said selected areas and other areas, at least partially setting said adhesive while said sheet is in compression, pressing and adhering respective layers of laminar material against said surfaces, and relaxing the compression on said sheet to conform said laminar material at least in part to resulting contours of said surfaces.

6. The process of claim 5 further including the step of stretching said sheet prior to adhering said layer thereto.

7. The process as claimed in claim 5 wherein said adhesive is simultaneously coated onto opposite surfaces of said sheet to form substantially coincident patterns of adhesive coated areas on the two surfaces of said sheet.

8. The process of laminating and contouring a liquid permeable, compressible and restorable sheet which comprises an adhesive onto selected areas of the surface of said sheet, placing a layer of laminar material on said surface substantially coextensively therewith, at a time when said adhesive is settable reducing the thickness of at least portions of the sheet by passing the sheet together with the layer of laminar material between two rolls, the roll contacting said laminar material being at a temperature of approximately 150 to 350° F., said portions including both said selected areas and other areas, at least partially setting said adhesive while said sheet is in compression, and relaxing the compression on said sheet.

References Cited

UNITED STATES PATENTS

| 2,621,139 | 12/1952 | Messing | 156—220 XR |
| 2,998,341 | 8/1961 | Vaughan | 156—229 XR |
| 3,070,476 | 12/1962 | Miller | 161—167 XR |
| 3,257,263 | 6/1966 | Miller | 161—119 |
| 3,316,136 | 4/1967 | Pufahl | 156—160 |
| 3,328,221 | 6/1967 | Pufahl | 156—209 |
| 3,352,741 | 11/1967 | Miller | 161—120 |

JOHN T. GOOLKASIAN, Primary Examiner

D. J. FRITSCH, Assistant Examiner

U.S. Cl. X.R.

156—220, 229, 291

PO-1050
(5/69)

UNITED STATES PATENT OFFICE
CERTIFICATE OF CORRECTION

Patent No. 3,507,729      Dated April 21, 1970

Inventor(s) Philip Miller

It is certified that error appears in the above-identified patent and that said Letters Patent are hereby corrected as shown below:

In the specification, column 8, line 75, "difficult" should be -- different --.

Claim 8, line 3, after "comprises" insert -- coating --.

SIGNED AND
SEALED
AUG 25 1970

(SEAL)
Attest:

Edward M. Fletcher, Jr.
Attesting Officer

WILLIAM E. SCHUYLER, JR.
Commissioner of Patents